United States Patent Office 3,301,877
Patented Jan. 31, 1967

3,301,877
PROCESS FOR PREPARATION OF 19-NOR-$\Delta^{5(10)}$-ANDROSTENE-3,17-DIONE AND 19-NOR-$\Delta^4$-ANDROSTENE-3,17-DIONE
Francisco Alvarez, Palo Alto, Calif., assignor to Syntex Corporation, Panama, Panama, a corporation of Panama
No Drawing. Filed May 5, 1965, Ser. No. 453,519
Claims priority, application Mexico, June 1, 1964, 77,275
18 Claims. (Cl. 260—397.3)

This invention relates to a novel process for the preparation of cyclopentanopolyhydrophenanthrene derivatives.

More particularly, this invention relates to a novel process for the preparation, in turn, of 19-nor-$\Delta^{5(10)}$-androstene-3,17-dione and 19-nor-$\Delta^4$-androstene-3,17-dione, which provides these valuable steroids in high yields with a minimum of by-product formation.

This process can be illustrated schematically as follows:

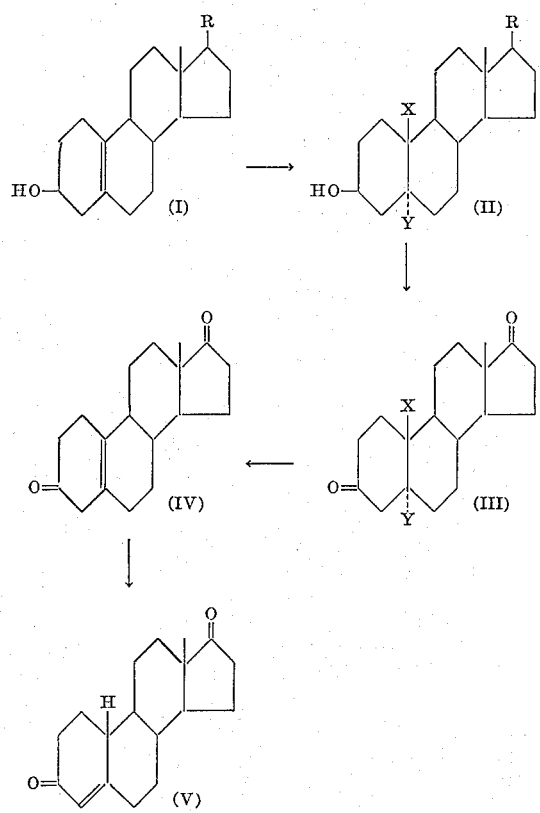

In these formulas R represents a $\beta$-hydroxyl group or a keto group; X represents chlorine, bromine or iodine and Y represents chlorine or bromine.

The first step in the above-illustrated process involves dihalogenating the 5(10)-double bond in either 19-nor-$\Delta^{5(10)}$-androstene-3$\beta$,17$\beta$-diol (I; R=$\beta$-hydroxyl) or 19-nor-$\Delta^{5(10)}$-androstene-3$\beta$-ol-17-one (I; R=keto) to produce the corresponding 5$\alpha$,10$\beta$-dihalo steroid, e.g., 5$\alpha$,10$\beta$-dibromo-19-nor-androstane-3$\beta$,17$\beta$-diol (II; R=$\beta$-hydroxyl, X and Y=bromine) or 5$\alpha$,10$\beta$-dibromo-19-norandrostan-3$\beta$-ol-17-one (II; R=keto; X and Y=bromine).

Where the halogens introduced at 5- and 10-carbon atoms are the same, i.e., two chlorine atoms or two bromine atoms, the reaction can be carried out as described in U.S. Patent No. 3,086,027 to Perelman et al. for the dibromination of $\Delta^{5(10)}$-keto steroids to give 5$\alpha$,10$\beta$-dibromo steroids, or as described in copending U.S. patent application Serial No. 107,050, filed May 2, 1961, now U.S. Pat. No. 3,139,446, using chlorine or bromine in liquid or gaseous form, or any other chlorinating or brominating agent or chlorine or bromine carrier which liberates chlorine as Cl$^+$—Cl$^-$ or bromine as Br$^+$—Br$^-$, such as N-chloroacetamide or N-chlorosuccinimide together with hydrogen chloride, N-bromoacetamide or N-bromosuccinimide together with hydrogen bromide, trimethylammonium bromide perbromide, pyridine perbromide hydrobromide, or the like, in an inert organic solvent such as pyridine or a substituted pyridine base, methylene dichloride, carbon tetrachloride, or the like.

Where the halogens introduced at the 5- and 10-carbon atoms are different, the reaction will be carried out as described in the aforementioned copending U.S. patent application, using a halogen halide, e.g., bromine chloride, iodine chloride, or the like, which can be generated in situ from a mixture of an N-haloamide or N-haloimide, such as N-chloro-, N-bromo- or N-iodoacetamide or N-chloro, N-bromo- or N-iodosuccinimide with hydrogen chloride or hydrogen bromide, e.g., mixtures of N-bromoacetamide and hydrogen chloride, N-iodosuccinimide and hydrogen chloride, and the like, in an inert organic solvent, such as one or more of those mentioned hereinabove.

The temperature at which this halogenation reaction is carried out will vary depending on the halogenating agent or halogen carrier used. Thus, where a halogenating agent or halogen carrier other than a mixture of an N-haloamide or imide and a hydrogen halide is used, the reaction will generally be carried out at a temperature of about 5° C. or lower, and preferably at from about −20° C. to above 0° C., although in certain cases temperatures up to room temperature (about 25° C.) can be employed. Where the halogenating agent is a mixture of an N-haloamide or -imide and a hydrogen halide, the reaction will preferably be carried out at a temperature of about −20° C. or less, e.g., temperature as low as −80° C. can be employed.

The resulting 5$\alpha$,10$\beta$-dihalo intermediate (II) is then oxidized to convert the 3$\beta$-hydroxyl group, and when present a 17$\beta$-hydroxyl group, to a keto group, thus producing the corresponding 5$\alpha$,10$\beta$-dihalo-19-nor-androstane-3,17-dione (III).

This reaction is also carried out in known manner, preferably in neutral to acidic medium, e.g., using chromium trioxide in a mixture of acetic acid and methylene dichloride at from about 15° C. to about 25° C. for from about 2 to about 5 hours, or under Jones oxidation conditions, which preferably involve the use of 8 N chromic acid in a sulfuric acid/acetone mixture at a temperature of about 0° C.

The resulting 5$\alpha$,10$\beta$-dihalo-3,17-dione (III) is then dehalogenated to regenerate the 5(10)-double bond, thus giving 19-nor-$\Delta^{5(10)}$-androstene-3,17-dione (IV).

This reaction can be carried out using zinc, preferably in the form of zinc dust, suspended in an inert organic solvent for the dihalo steroid, e.g., a lower alkanol such as methanol or ethanol, a holengated hydrocarbon such as methylene dichloride, ethylene dichloride, chloroform, carbon tetrachloride or chlorobenzene, an ether such as diethyl ether, diisopropyl ether, dioxane or tetrahydrofuran, or the like, as well as mixtures thereof, at a temperature of from about 0° C. to about 50° C., and preferably at room temperature, for from about 30 minutes or less to about 12 hours or longer.

Dehalogenation can also be accomplished at room temperature by using zinc suspended in an ether, e.g., one of those mentioned hereinabove, containing a catalytic amount, e.g., one or two drops, of a lower hydrocarbon carboxylic acid, preferably acetic acid.

In the final step of the above illustrated process (which is not practiced when the $\Delta^{5(10)}$-3,17-dione is the desired end product), the $\Delta^{5(10)}$-3,17-dione (IV) is rearranged to the corresponding $\Delta^4$-compound, i.e., 19-nor-$\Delta^4$-androstene-3,17-dione (V). This can be accomplished by adding to the $\Delta^{5(10)}$-3,17-dione, dissolved in an inert organic solvent, e.g., a ketone such as acetone, methyl ethyl ketone or methyl propyl ketone; an ether or a lower alkanol, such as those mentioned hereinabove or the like, as well as mixtures thereof, a catalytic amount of either a strong mineral or organic acid, i.e., an amount sufficient to provide a solution having a pH of about 1 or less, such as can be provided by an aqueous 1-10% solution of hydrochloric, sulfuric, phosphoric, iodic, perchloric, trifluoroacetic or p-toluenesulfonic acid, or the like, or a strong base, i.e., an amount sufficient to provide a solution having a pH of about 13 or greater, such as can be provided by a 0.001-1% solution of sodium hydroxide, potassium hydroxide, or the like in a lower alkanol, such as methanol, ethanol, or the like.

When an acid is used as the catalyst, this reaction will generally be carried out at a temperature of from about 60° C. to about 80° C. or higher for from about 2-3 minutes to about 1 hour, while with a base, temperatures ranging from about 0° C. to about 25° C. will be used, again for from about 2-3 minutes to about 1 hour.

The final products obtainable by the above-illustrated process can also be produced, in fewer steps, by Oppenauer oxidation of 19-nor-$\Delta^{5(10)}$-androstene - 3β,17β-diol 19-nor - $\Delta^{5(10)}$-androsten - 3β-ol-17-one to give 19-nor-$\Delta^{5(10)}$-androstene - 3,17-dione, which can then be rearranged as described hereinabove to 19-nor-$\Delta^4$-androstene-3,17-dione. Nevertheless, it has been found, quite unexpectedly, that the novel process of the present invention provides the desired products in higher yields and in purer form than does the procedure involving Oppenauer oxidation, and thus provides a decided economic advantage despite its greater complexity.

In order that those skilled in the art can more fully understand the present invention, the following examples are set forth. These Examples are given solely for the purpose of illustrating the invention, and should not be considered as expressing limitations unless so set forth in the appended claims:

Example I

To a solution of 25 grams of 19-nor-$\Delta^{5(10)}$-androsten-3β-ol-17-one in 120 cc. of methylene dichloride, maintained at −5° C., there was added dropwise over a 30 minute period, with stirring, a solution of 17.4 grams of bromine in 30 cc. of methylene dichloride. The resulting reaction mixture was allowed to stand at 0° C. for 5 minutes, and was then poured into 150 cc. of an aqueous 5% sodium bicarbonate solution and extracted with methylene dichloride. The thus-obtained extract was washed with water, dried over anhydrous sodium sulfate, and evaporated to dryness. Crystallization from acetone/hexane gave 5α,10β-dibromo-19-nor-androstran-3β-ol-17-one.

By repeating this procedure using 19-nor-$\Delta^{5(10)}$-androstene-3β,17β-diol as the starting steroid, 5α,10β-dibromo-19-nor-androstane-3β,17β-diol was obtained.

Similarly, by replacing the bromine solution with a solution containing an equivalent amount of chlorine, and using 19-nor-$\Delta^{5(10)}$-androsten - 3β-ol-17-one and 19-nor-$\Delta^{5(10)}$-androstene-3β,17β-diol as the starting steroids, 5α,10β-dichloro - 19-nor-androstan - 3β-ol-17-one and 5α,10β-dichloro-19-nor-androstane - 3β,17β-diol, respectively, were obtained.

Example II

A suspension of 750 mg. of 19-nor-$\Delta^{5(10)}$-androsten-3β-ol-17-one and 1.1 molar equivalents (based on the weight of said $\Delta^{5(10)}$-steroid) of N-bromoacetamide in 35 cc. of methylene dichloride was added dropwise, with stirring, over a 3 minute period to a mixture of 75 molar equivalents (based on the weight of said $\Delta^{5(10)}$-steroid) of hydrogen chloride in 20 cc. of methylene dichloride maintained at −80° C. The resulting reaction mixture was allowed to stand at −80° C. for one hour, then at 0° C. for one hour, and then added cautiously to an excess of an ice-cold aqueous sodium carbonate solution and extracted with methylene dichloride. The thus-obtained extract was washed with water, dried over anhydrous sodium sulfate and evaporated to dryness. Crystallization from acetone/hexane gave 5α-chloro-10β-bromo-19-nor-androstan-3β-ol-17-one.

By repeating this procedure using 19-nor-$\Delta^{5(10)}$-androstene-3β,17β-diol as the starting steroid, 5α-chloro-10β-bromo-19-nor-androstane-3β,17β-diol was obtained.

Example III

A suspension of 1 gram of 19-nor-$\Delta^{5(10)}$-androsten-3β-ol-17-one and 1.1 molar equivalents (based on the weight of said $\Delta^{5(10)}$-steroid) of N-iodosuccinimide in 20 cc. of methylene dichloride was added dropwise, with stirring, over a 5 minute period to a mixture of 75 molar equivalents (based on the weight of said $\Delta^{5(10)}$-steroid) of hydrogen chloride in 20 cc. of methylene dichloride maintained at −80° C. The resulting reaction mixture was allowed to stand at −80° C. for 2 hours, then at 0° C. for 12 hours, and then added cautiously to an excess of an ice-cold aqueous sodium bicarbonate solution and extracted with methylene dichloride. The thus-obtained extract was washed with water, then with an aqueous sodium thiosulfate solution, and again with water, then dried over anhydrous sodium sulfate and evaporated to dryness. Crystallization from acetone/hexane gave 5α-chloro-10β-iodo-19-nor-androstan-3β-ol-17-one.

By repeating this procedure using 19-nor-$\Delta^{5(10)}$-androstene-3β, 17β-diol as the starting steroid, 5α-chloro-10β-iodo-19-nor-androstan-3β,17β-diol was obtained.

Example IV

Forty grams of the 5α,10β-dibromo-19-nor-androstan-3β-ol-17-one obtained as described in Example I hereinabove were admixed with 700 cc. of methylene chloride, 16 cc. of water and 155 cc. of aqueous 30% acetic acid, and then cooled to 20° C. Next, a solution of 17.1 grams of chromium trioxide in a mixture of 13.5 cc. of water and 22.5 cc. of 30% acetic acid was added dropwise, with stirring, over a 30 minute period, while maintaining the temperature at 20-25° C. The resulting reaction mixture was allowed to stand at room temperature (about 25° C.) for 3½ hours. Following this reaction period the reaction mixture was diluted with 80 cc. of methylene dichloride and then washed twice with 160 cc. portions of water. The washings were then extracted three times, using 50 cc. portions of methylene dichloride, and these extracts, combined with the methylene dichloride-diluted reaction mixture, were then dried over anhydrous sodium sulfate and evaporated to dryness. Crystallization from methanol gave 5α,10β-dibromo-19-nor-androstane-3,17-dione.

By repeating this procedure using the remaining 5α, 10β-dihalo steroids prepared as described in Examples I, II, and III hereinabove, shown in column I, the corresponding 3,17-diones, shown in column II, were obtained:

I

5α,10β-dibromo-19-nor-androstane-3β,17β-diol
5α,10β-dichloro-19-nor-androstan-3β-ol-17-one
5α,10β-dichloro-19-nor-androstan-3β,17β-diol
5α-choro-10β-bromo-19-nor-androstan-3β-ol-17-one
5α-chloro-10β-bromo-19-nor-androstan-3β,17β-diol
5α-chloro-10β-iodo-19-nor-androstan-3β-ol-17-one
5α-chloro-10β-iodo-19-nor-androstan-3β,17β-diol 5α,10β-dibromo-19-nor-androstane-3,17-dione
5α,10β-dichloro-19-nor-androstane-3,17-dione
5α,10β-dichloro-19-nor-androstane-3,17-dione
5α-chloro-10β-bromo-19-nor-androstane-3,17-dione
5α-chloro,10β-bromo-19-nor-androstane-3,17-dione
5α-chloro-10β-iodo-19-nor-androstane-3,17-dione
5α-chloro-10β-iodo-19-nor-androstane-3,17-dione

Example V

The 5α,10β-dibromo-19-nor-androstane-3,17-dione obtained as described in Example IV hereinabove (35 grams) was admixed with 12.5 grams of zinc dust and 150 cc. of methanol. The resulting reaction mixture was refluxed for 30 minutes and then evaporated to dryness. The residue, dissolved in 200 cc. of chloroform, was then washed with 200 cc. of an aqueous 20% hydrochloric acid solution and then with an aqueous, saturated sodium bicarbonate solution, with the washings being extracted in each case with 100 cc. of chloroform. The combined original chloroform solution and chloroform washings were then dried over anhydrous sodium sulfate and evaporated to dryness. Crystallization from acetone/hexane gave 19-nor-$\Delta^{5(10)}$-androstane-3,17-dione.

This procedure was then repeated in every detail but one, namely, 5α,10β-dibromo-19-nor-androstane-3,17-dione was replaced by the remaining 5α,10β-dihalo-3,17-diones prepared as described in Example IV hereinabove. In each case, 19-nor-$\Delta^{5(10)}$-androstene-3,17-dione was obtained.

Example VI

A solution of 10 grams of 19-nor-$\Delta^{5(10)}$-androstane-3,17-dione in 50 cc. of acetone containing 0.5 cc. of concentrated hydrochloric acid (33% strength) was refluxed for 30 minutes. Following this reaction period the reaction mixture was neutralized with solid sodium bicarbonate, then diluted with water. The resulting precipitate was separated by filtration, washed with water and dried. Crystallization from acetone/hexane gave 19-nor-$\Delta^4$-androstene-3,17-dione.

This procedure was then repeated in every detail but one, namely, hydrochloric acid was replaced by equivalent amounts of concentrated sulfuric acid, concentrated phosphoric acid and solid p-toluenesulfonic acid monohydrate. In each case, 19-nor-$\Delta^4$-androstene-3,17-dione was obtained.

Example VII

One hundred grams of 19-nor-$\Delta^{5(10)}$-androstene-3,17-dione were dissolved in one liter of a 1% solution of potassium hydroxide in methanol, and the resulting solution was allowed to stand for 30 minutes at room temperature. Following this reaction period aqueous concentrated hydrochloric acid was added dropwise to the reaction mixture until it became slightly acid. The resulting slightly acid solution was concentrated under vacuum to a volume of 200 cc., then diluted with 2 liters of ice water. The thus-formed precipitate was collected by filtration, washed with water to neutrality, dried, and crystallized from acetone/hexane to give 19-nor-$\Delta^4$-androstene-3,17-dione.

It will be obvious to those skilled in the art that other changes and variations can be made in carrying out the present invention without departing from the spirit and scope thereof as defined in the appended claims.

I claim:

1. A process for the preparation of 19-nor-$\Delta^{5(10)}$-androstene-3,17-dione which comprises halogenating the 5(10)-double bond in a compound selected from the group consisting of 19-nor-$\Delta^{5(10)}$-androstene-3β,17β-diol and 19-nor-$\Delta^{5(10)}$-androsten-3-ol-17-one to produce the corresponding 5α,10β-dihalo steroid wherein the 5α-halogen is selected from the group consisting of chlorine and bromine and the 10β-halogen is selected from the group consisting of chlorine, bromine and iodine, oxidizing said 5α,10β-dihalo steroid to produce 5α,10β-dihalo-19-nor-androstane-3,17-dione, and dehalogenating said 5α,10β-dihalo-3,17-dione, using zinc in an inert organic solvent, to produce 19-nor-$\Delta^{5(10)}$-androstene-3,17-dione.

2. A process for the preparation of 19-nor-$\Delta^{5(10)}$-androstene-3,17-dione which comprises brominating the 5(10)-double bond in 19-nor-$\Delta^{5(10)}$-androstene-3β,17β-diol to produce 5α,10β-dibromo-19-nor-androstane-3β,17β-diol, oxidizing said 5α,10β-dibromo steroid, using chromium trioxide in acetic acid, to produce 5α,10β-dibromo-19-nor-androstane-3,17-dione, and debrominating said 5α,10β-dibromo-3,17-dione, using zinc dust in methanol, to produce 19-nor-$\Delta^{5(10)}$-androstene-3,17-dione.

3. A process for the preparation of 19-nor-$\Delta^{5(10)}$-androstene-3,17-dione which comprises chlorinating the 5(10)-double bond in 19-nor-$\Delta^{5(10)}$-androstene-3β,17β-diol to produce 5α,10β-dichloro-19-nor-androstane-3β,17β-diol, oxidizing said 5α,10β-dichloro steroid, using chromium trioxide in acetic acid, to produce 5α,10β-dichloro-19-nor-androstane-3,17-dione, and dechlorinating said 5α,10β-dichloro-3,17-dione, using zinc dust in methanol, to produce 19-nor-$\Delta^{5(10)}$-androstene-3,17-dione.

4. A process for the preparation of 19-nor-$\Delta^{5(10)}$-androstene-3,17-dione which comprises halogenating the 5(10)-double bond in 19-nor-$\Delta^{5(10)}$-androstene-3β,17β-diol, using bromine chloride, to produce 5α-chloro-10β-bromo-19-nor-androstane-3β,17β-diol, oxidizing said 5α-chloro-10β-bromo steroid, using chromium trioxide in acetic acid, to produce 5α-chloro-10β-bromo-19-nor-androstane-3,17-dione, and dehalogenating said 5α-chloro-10β-bromo-3,17-dione, using zinc dust in methanol, to produce 19-nor-$\Delta^{5(10)}$-androstene-3,17-dione.

5. A process for the preparation of 19-nor-$\Delta^{5(10)}$-androstene-3,17-dione which comprises halogenating the 5(10)-double bond in 19-nor-$\Delta^{5(10)}$-androstene-3β,17β-diol, using iodine chloride, to produce 5α-chloro-10β-iodo-19-nor-androstane-3β,17β-diol, oxidizing said 5α-chloro-10β-iodo steroid, using chromium trioxide in acetic acid, to produce 5α-chloro-10β-iodo-19-nor-androstane-3,17-dione, and dehalogenating said 5α-chloro-10β-iodo-3,17-dione, using zinc dust in methanol, to produce 19-nor-$\Delta^{5(10)}$-androstene-3,17-dione.

6. A process for the preparation of 19-nor-$\Delta^{5(10)}$-androstene-3,17-dione which comprises brominating the 5(10)-double bond in 19-nor-$\Delta^{5(10)}$-androsten-3-ol-17-one to produce 5α,10β-dibromo-19-nor-androstane-3β-ol-17-one, oxidizing said 5α,10β-dibromo steroid, using chromium trioxide in acetic acid, to produce 5α,10β-dibromo-19-nor-androstane-3,17-dione, and debrominating said 5α,10β-dibromo-3,17-dione, using zinc dust in methanol, to produce 19-nor-$\Delta^{5(10)}$-androstene-3,17-dione.

7. A process for the preparation of 19-nor-$\Delta^{5(10)}$-androstene-3,17-dione which comprises chlorinating the 5(10)-double bond in 19-nor-$\Delta^{5(10)}$-androsten-3β-ol-17-one to produce 5α,10β-dichloro-19-nor-androstan-3β-ol-17-one, oxidizing said 5α,10β-dichloro steroid, using chromium trioxide in acetic acid, to produce 5α,10β-dichloro-19-nor-androstane-3,17-dione, and dechlorinating said 5α,10β-dichloro-3,17-dione, using zinc dust in methanol, to produce 19-nor-$\Delta^{5(10)}$-androstene-3,17-dione.

8. A process for the preparation of 19-nor-$\Delta^{5(10)}$-androstene-3,17-dione which comprises halogenating the 5(10)-double bond in 19-nor-$\Delta^{5(10)}$-androsten-3β-ol-17-one, using bromine chloride, to produce 5α-chloro-10β-bromo-19-nor-androstan-3β-ol-17-one, oxidizing said 5α-chloro-10β-bromo steroid, using chromium trioxide in acetic acid, to produce 5α-chloro-10β-bromo-19-nor-androstane-3,17-dione, and dehalogenating said 5α-chloro-10β-bromo-3,17-dione, using zinc dust in methanol, to produce 19-nor-$\Delta^{5(10)}$-androstene-3,17-dione.

9. A process for the preparation of 19-nor-$\Delta^{5(10)}$-androstene-3,17-dione which comprises halogenating the 5(10)-double bond in 19-nor-$\Delta^{5(10)}$-androstene-3β-ol-17-one, using iodine chloride, to produce 5α-chloro-10β- iodo-19-nor-androstan-3β-ol-17-one, oxidizing said 5α-chloro-10β-iodo steroid, using chromium trioxide in acetic acid, to produce 5α-chloro-10β-iodo-19-nor-androstane-3,17-dione, and dehalogenating said 5α-chloro-10β-iodo-3,17-dione, using zinc dust in methanol, to produce 19-nor-Δ$^{5(10)}$-androstene-3,17-dione.

10. A process for the preparation of 19-nor-Δ$^4$-androstene-3,17-dione which comprises halogenating the 5(10)-double bond in a compound selected from the group consisting of 19-nor-Δ$^{5(10)}$-androstene-3β,17β-diol and 19-nor-Δ$^{5(10)}$-androsten-3β-ol-17-one to produce the corresponding 5α,10β-dihalo steroid wherein the 5α-halogen is selected from the group consisting of chlorine and bromine and the 10β-halogen is selected from the group consisting of chlorine, bromine and iodine, oxidizing said 5α,10β-dihalo steroid to produce 5α,10β-dihalo-19-nor-androstane-3,17-dione, dehalogenating said 5α,10β-dihalo-3,17-dione, using zinc in an inert organic solvent, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androsten-3,17-dione.

11. A process for the preparation of 19-nor-Δ$^4$-androstene-3,17-dione which comprises brominating the 5(10)-double bond in 19-nor-Δ$^{5(10)}$-androstene-3β,17β-diol to produce 5α,10β-dibromo-19-nor-androstane-3β,17β-diol, oxidizing said 5α,10β-dibromo steroid, using chromium trioxide in acetic acid, to produce 5α,10β-dibromo-19-nor-androstane-3,17-dione, debrominating said 5α,10β-dibromo-3,17-dione, using zinc dust in methanol, to produce 19-nor-Δ$^{5(10)}$-androstene-3,17-dione, and contacting said Δ$^{(510)}$-3,17-dione, in an inert organic solvent, with a catalytic amount of a compound selected from the group group consisting of strong acids and strong bases, to produce 19-nor-Δ$^4$-androstene-3,17-dione.

12. A process for the preparation of 19-nor-Δ$^4$-androstene-3,17-dione which comprises chlorinating the 5(10)-double bond in 19-nor-Δ$^{5(10)}$-androstene-3β,17β-diol to produce 5α,10β-dichloro-19-nor-androstane-3β,17β-diol, oxidizing said 5α,10β-dichloro steroid, using chromium trioxide in acetic acid, to produce 5α,10β-dichloro-19-nor-androstane-3,17-dione, dechlorinating said 5α,10β-dichloro-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androstene-3,17-dione.

13. A process for the preparation of 19-nor-Δ$^4$-androstene-3,17-dione which comprises halogenating the 5(10)-double bond in 19-nor-Δ$^{5(10)}$-androstene-3β,17β-diol, using bromine chloride, to produce 5α-chloro-10β-bromo-19-nor-androstane-3β,17β-diol, oxidizing said 5α-chloro-10β-bromo-steroid, using chromium trioxide in acetic acid, to produce 5α-chloro-10β-bromo-19-nor-androstane-3,17-dione, dehalogenating said 5α-chloro-10β-bromo-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androstene-3,17-dione.

14. A process for the preparation of 19-nor-Δ$^4$-androstene-3,17-dione which comprises halogenating the 5(10)-double bond in 19-nor-Δ$^{5(10)}$-androstene-3β,17β-diol, using iodine chloride, to produce 5α-chloro-10β-iodo-19-nor-androstane-3β,17β-diol, oxidizing said 5α-chloro-10β-iodo steroid, using chromium trioxide in acetic acid, to produce 5α-chloro-10β-iodo-19-nor-androstane-3,17-dione, dehalogenating said 5α-chloro-10β-iodo-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androstene-3,17-dione.

15. A process for the preparation of 19-nor-Δ$^4$-androstene-3,17-dione which comprises brominating the 5(10)-double bond in 19-nor-Δ$^{5(10)}$-androsten-3β-ol-17-one to produce 5α,10β-dibromo-19-nor-androstan-3β-ol-17-one, oxidizing said 5α,10β-dibromo steroid, using chromium trioxide in acetic acid, to produce 5α,10β-dibromo-19-nor-androstane-3,17-dione, debrominating said 5α,10β-dibromo-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androstene-3,17-dione.

16. A process for the preparation of 19-nor-Δ$^4$-androstene-3,17-dione which comprises chlorinating the 5(10)-double bond in 19-nor-Δ$^{5(10)}$-androsten-3β-ol-17-one to produce 5α,10β-dichloro-19-nor-androstene-3β-ol-17-one, oxidizing said 5α,10β-dichloro steroid, using chromium trioxide in acetic acid, to produce 5α,10β-dichloro-19-nor-androstane-3,17-dione, dechlorinating said 5α,10β-dichloro-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-androstene-3,17-dione.

17. A process for the preparation of 19-nor-Δ$^4$-androstene-3,17-dione which comprises halogenating the 5(10)-double bond in 19-nor-Δ$^{5(10)}$-androsten-3β-ol-17-one, using bromine chloride, to produce 5α-chloro-10β-bromo-19-nor-androstan-3β-ol-17-one, oxidizing said 5α-chloro-10β-bromo steroid, using chromium trioxide in acetic acid, to produce 5α-chloro-10β-bromo-19-nor-androstane-3,17-dione, dehalogenating said 5α-chloro-10β-bromo-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androstene-3,17-dione.

18. A process for the preparation of 19-nor-Δ$^4$-androstene-3,17-dione which comprises halogenating the 5(10)-double bond in 19-nor-Δ$^{5(10)}$-androsten-3β-ol-17-one, using iodine chloride, to produce 5α-chloro-10β-iodo-androstan-3β-ol-17-one, oxidizing said 5α-chloro-10β-iodo steroid, using chromium trioxide in acetic acid, to produce 5α-chloro-10β-iodo-19-nor-androstane-3,17-dione, dehalogenating said 5α-chloro-10β-iodo-3,17-dione, using zinc dust in methanol, to produce 19-nor-Δ$^{5(10)}$-androstene-3,17-dione, and contacting said Δ$^{5(10)}$-3,17-dione, in an inert organic solvent, with a catalytic amount of a compound selected from the group consisting of strong acids and strong bases, to produce 19-nor-Δ$^4$-androstene-3,17-dione.

No references cited.

LEWIS GOTTS, *Primary Examiner.*

HENRY A. FRENCH, *Assistant Examiner.*